March 31, 1942. K. C. KERRIHARD 2,277,988
INSULATION ELEMENT
Filed June 16, 1939 2 Sheets-Sheet 1
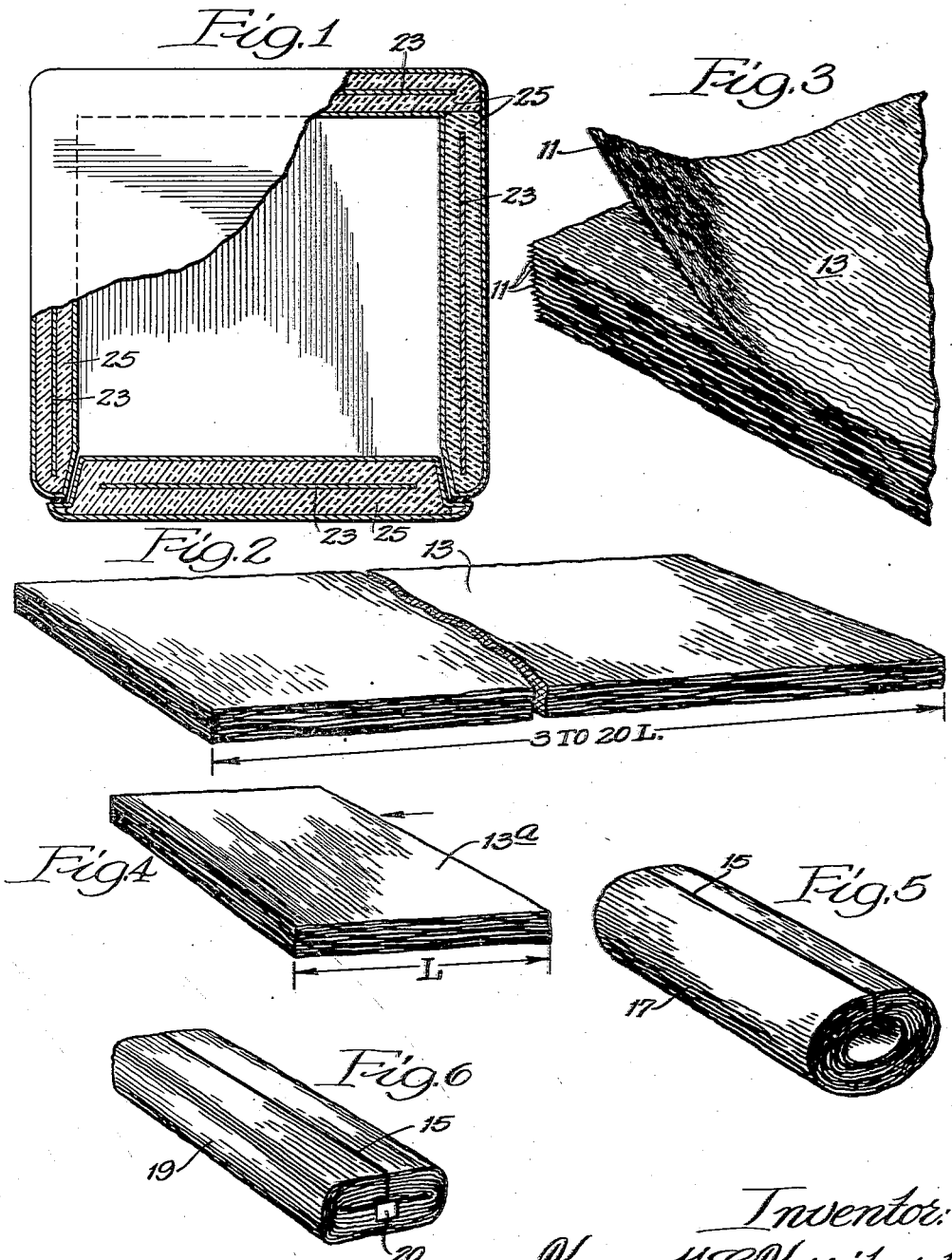
Inventor:
Kenneth C. Kerrihard,
By Fisher, Clapp, Soans & Pond,
Attorneys.

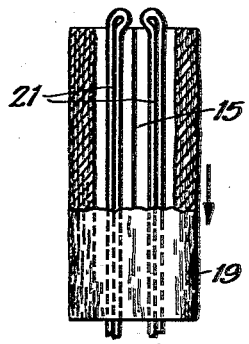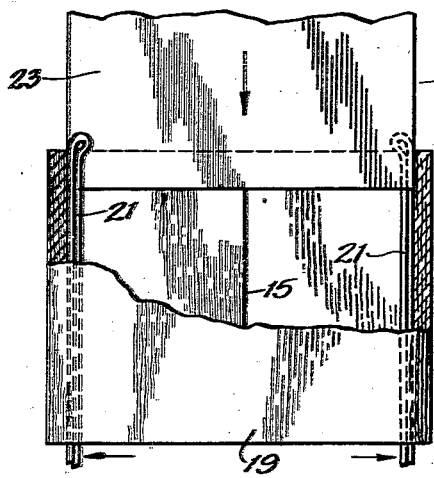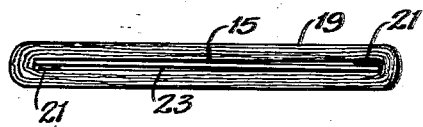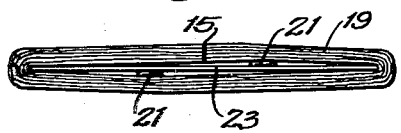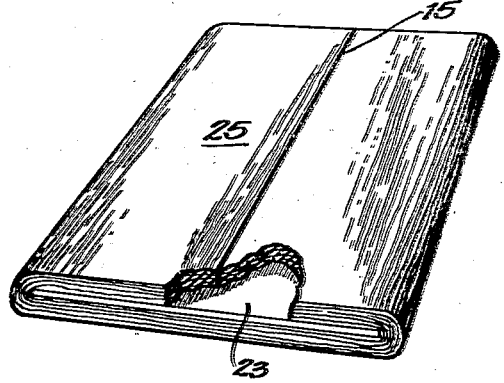

Patented Mar. 31, 1942

2,277,988

UNITED STATES PATENT OFFICE 2,277,988

INSULATION ELEMENT

Kenneth C. Kerrihard, Evanston, Ill., assignor to Paper Patents Company, Neenah, Wis., a corporation of Wisconsin Application June 16, 1939, Serial No. 279,423

4 Claims. (Cl. 154—44)

My invention relates generally to the art of thermal insulation and has particular reference to thermal insulation for insulating the wall spaces of refrigerators or the like.

From the viewpoint of obtaining maximum insulating efficiency and of minimizing manufacturing costs, refrigerator wall spaces can be most satisfactorily insulated by the use of single bats or cells of insulating material which can be inserted as a unit into the space to be insulated. However, because of the fact that the dimensions of these wall spaces vary rather substantially between the different lines and even between the different models of a single line, the use therein of unitary bat or cell insulation has been accompanied by various difficulties, one of the most serious of which is the necessity that the manufacturer maintain large stocks of bats or cells in a very large variety of sizes.

In fact, the practical difficulties accompanying the use of cell type insulation in wall spaces of this character have greatly restricted its use and have resulted in the adoption of many expedients, most of which provide much less efficient insulation than the cell type. I have discovered, however, that most of these difficulties can be overcome by the use of a cell type insulation possessing the inherent capability that the dimensions thereof can be readily changed to adapt the cell for use in wall spaces of substantially differing dimensions, and the principal object of the present invention is to provide insulation of this type.

The accomplishment of this object involves the provision of an intermediate product which consists of a relatively dense, laminated bat of novel type, and a novel, highly practical process whereby these dense bats can be converted into low density insulating cells of any desired dimensions, within reasonable limits.

Other objects and the various important advantages of the invention, included among which are the provision of an improved cell type insulating product which will not change its shape or dimensions by becoming compressed or by settling during use, will be made more apparent by reference to the accompanying drawings wherein are illustrated one embodiment of the product of my invention and one method of manufacturing the same. In the drawings—

Figure 1 is a plan view, partially in section, of a refrigerator or like piece of equipment having wall spaces which are provided with the cell type insulation of the present invention;

Figure 2 is a perspective view illustrating a low density pad or bat product which is used in the manufacture of the product of my invention;

Figure 3 is an enlarged fragmentary view of a portion of the pad or bat product illustrated in Figure 2;

Figures 4, 5, and 6 are perspective views illustrating three steps in the manufacture of the intermediate product which is used in making the cell type insulation of my invention;

Figures 7, 8, 9, and 10 are fragmentary views illustrating four steps in the process of converting the dense bat of Figure 6 into the low density cell type insulation of the present invention; and Figure 11 is a perspective view of the novel cell type insulating product of my invention.

In the manufacture of the dense bat which constitutes the intermediate product in the manufacture of the improved cell type insulation of my invention, a plurality of individual sheets 11 (Figure 3) of thin, creped, cellulosic tissue are superposed to form a multi-ply, rectangularly shaped pad 13, as is illustrated in Figures 2 and 3, the creping in all of the sheets 11 extending transversely of the pad 13. The individual sheets 11 should have a basis weight within the range of from 4 to 9 pounds for 480 flat, uncreped sheets 24 by 36 inches, and may contain substantial percentages of asphalt. Asphalt bearing, creped, cellulosic sheets of a particularly suitable type and methods of manufacturing such sheets are described in U. S. Letters Patent No. 2,170,655 granted on August 22, 1939, in the name of Charles A. Fourness (application Serial No. 99,520).

The low density pad 13 which is formed by the superposed plies or sheets 11 has a unit density, under ordinary manufacturing conditions, within the range of from about 1.25 to 2.00 pounds per cubic foot when made of the asphalt bearing sheets disclosed in Fourness Patent 2,170,655, and a unit density of from about 3.0 to 5.5 pounds per cubic foot when made of plain cellulosic sheets. Any desired number of sheets or plies 11 may be used, depending on the thickness of insulation desired in the final product. For example, fifty plies of the asphalt bearing sheets of the Fourness type will yield a pad 1.61 inches thick.

As the next step in the manufacture of the intermediate bat product, the low density pad 13 is longitudinally compressed in a direction substantially perpendicular to the creping therein so as to decrease its length to about $\frac{1}{3}$ to $\frac{1}{20}$ of its initial uncompressed length, the unit density of the pad or bat being simultaneously increased within the range of from about 3 to 20 times. The compressed bat is illustrated at 13$^a$ in Figure 4, and a complete description of suitable methods and apparatus for carrying out this compression will be found in the application of Richard K. Neller, Serial No. 247,561 which was filed on December 24, 1938, and which is assigned to the assignee of this invention.

As the third step in the manufacture of the intermediate bat product of the invention, the ends of the compressed pad 13$^a$ are folded over and joined together by a suitable adhesive 15, such as asphalt, to form a cylindrical tube 17, as illustrated in Figure 5, and for shipping purposes this tube 17 is preferably flattened out into a generally rectangularly shaped, tubular bat 19, as illustrated in Figure 6. The creping in all of the constituent sheets 11 making up the bat 19 extends longitudinally of the bat, and to prevent the sides of the bat from sticking together, a strip of paper 20 or other suitable material may be placed along the inner surface of the adhesive 15, as illustrated in Figure 6.

The tubular bat 19 illustrated in Figure 6 by virtue of its tubular form and particular constructional features can be expanded to form a low density insulating cell suitable for use in the insulation of refrigerator wall spaces and the like. Moreover, as will hereinafter appear, the expansion of the tubular bat 19 can be readily controlled within relatively wide limits, thereby making possible the manufacture, from a single standard dimension compressed bat, of insulating bats or cells of widely varying physical dimensions.

The preferred method of accomplishing the conversion of the dense tubular bats 19 into the novel low density insulating cell of the present invention is illustrated in Figures 7, 8, 9, and 10. The tubular bat 19 is first slipped over two spaced, parallel bar members 21 which are then moved apart a distance sufficient to stretch the bat to the same dimensions as the space which it is desired to insulate. With the bar members 21 in this position, a suitably proportioned core or stiffening member 23 which may comprise a stiff sheet of corrugated board or other suitable material is inserted in the expanded tube 19, as illustrated in Figures 8 and 9, whereupon the bars 21 are moved together so as to release the expanded tube 19 and its core 23 which may then be slipped off the bars 21. The cell product resulting from these operations is illustrated at 25 in Figure 11. The inherent resilience of the superposed plies 11 which constitute the outer tubular portion of the cell holds the core 23 in place and makes the product very convenient to handle and place within the space to be insulated. Further, the core 23 provides a permanent reinforcement which prevents sagging of the insulating portion of the cell during use.

It will be apparent that the tubular bat 19 may be made by compressing a continuous multi-ply tube formed by winding the desired number of plies on a suitable tubular form. When this method is followed, however, the ends of the tube become badly compressed during the compressing operation, and the final cell product is not nearly so satisfactory as the product made by joining the ends of a pad or bat which has been compressed in the flat state as illustrated in Figures 2, 4, and 5.

In the foregoing I have disclosed an improved cell type insulation particularly designed for use in insulating the wall spaces in refrigerators or the like, and method of making the same. The invention involves the use of a relatively high density bat of a particular type which can be economically shipped and handled, and which at the same time can be readily converted into an insulating cell of almost any dimensions that might reasonably be desired. This latter characteristic is, as previously pointed out, of very great importance, for the reason that it permits a refrigerator manufacturer to insulate his entire line of refrigerators by the use of a single, or at the most two or three, standard sizes of the compressed bats.

Moreover, the low density insulating cell resulting from the practice of the present invention possesses important advantages over the product of the prior art, primarily due to the presence of the internal reinforcing or stiffening core member 23 which is used to determine the size of the resultant product. This core prevents sagging of the insulation during use and renders the product very easy to handle.

It will be apparent to those skilled in the art that various modifications of the above described article and method of manufacturing and using the same may be employed. It is my desire, therefore, that the accompanying claims shall be accorded the broadest reasonable construction consistent with the language appearing therein and the prior art.

I claim the following as my invention:

1. A tubular bat which comprises a plurality of superposed sheets of thin, creped, cellulosic tissue, the creping in said sheets extending longitudinally of said bat, said superposed sheets being compressed and joined together along a pair of opposite edges to form a tubular structure, whereby the bat may be extended widthwise to provide a lower density, flat-sided, tubular bat of size and shape corresponding substantially to that of a cavity within which the extended bat is to be received.

2. A tubular bat which comprises a plurality of superposed sheets of thin, creped, cellulosic tissue, the creping in said sheets extending longitudinally of said bat, said superposed sheets being compressed and joined together along a pair of opposite edges to form a tubular structure which may be extended widthwise within the range of from about 2 to 20 times its original width to receive a stiff core member and to provide a lower density, flat-sided, tubular bat of size and shape corresponding substantially to that of a cavity within which the extended bat is to be received.

3. A tubular bat which comprises a plurality of superposed sheets of thin, creped, cellulosic tissue, the creping in said sheets extending longitudinally of said bat, said sheets having a basis weight within the range of from about 4 to 9 pounds for 480 sheets 24 x 36 inches, said superposed sheets being compressed and joined together along a pair of opposite edges to form a tubular structure, whereby the bat may be extended widthwise to provide a lower density, flat-sided, tubular bat of size and shape corresponding substantially to that of a cavity within which the extended bat is to be received.

4. A tubular bat which comprises a plurality of superposed sheets of thin, creped, cellulosic tissue, the creping in said sheets extending longitudinally of said bat, said sheets having a basis weight within the range of from about 4 to 9 pounds for 480 sheets 24 x 36 inches and containing a substantial percentage by weight of asphalt, said superposed sheets being compressed and joined together along a pair of opposite edges to form a tubular structure which may be extended widthwise within the range of from about 2 to 20 times its original width to receive a stiff core member and to provide a lower density, flat-sided, tubular bat of size and shape corresponding substantially to that of a cavity within which the extended bat is to be received.

KENNETH C. KERRIHARD.